3,148,989
DECONTAMINATION OF MILK FROM RADIO-ACTIVE ANIONIC INGREDIENTS

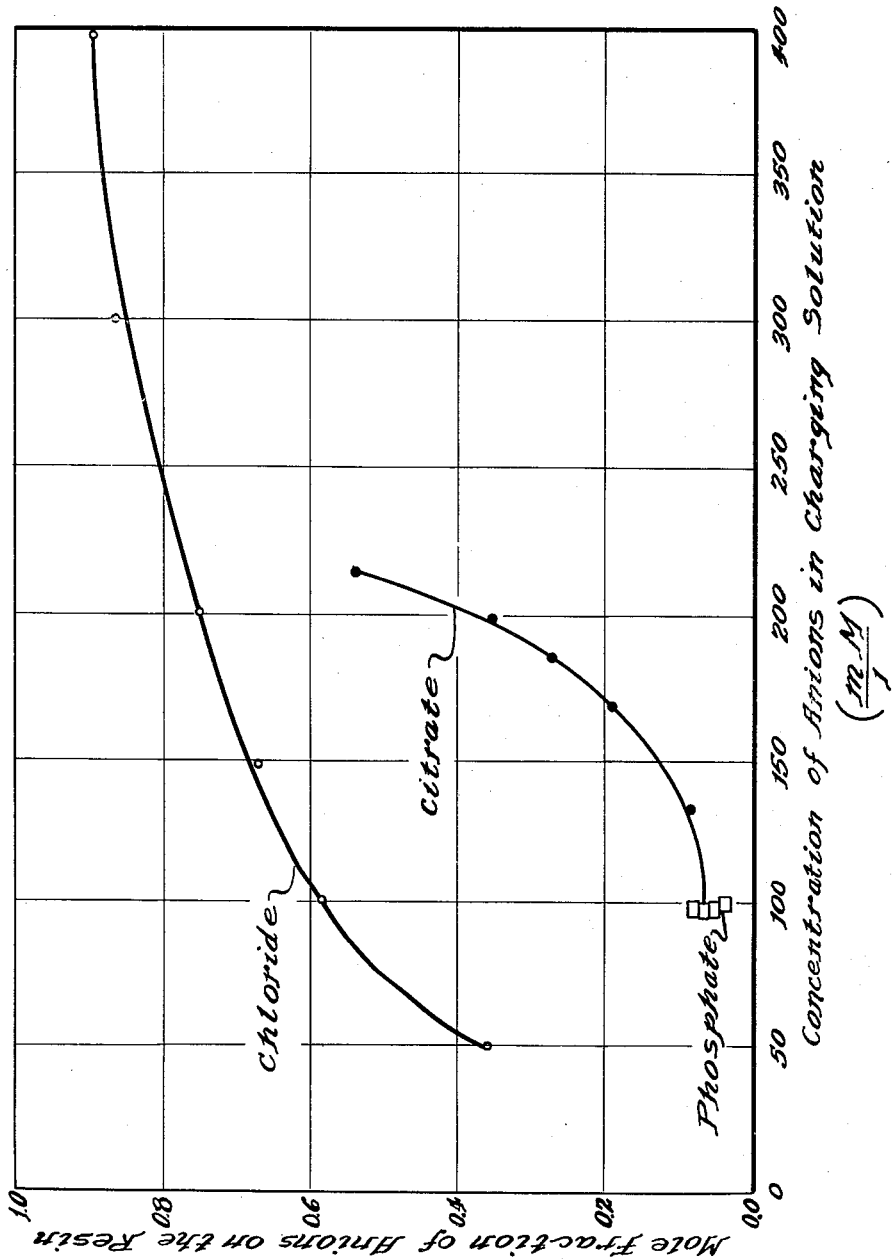

Gopala K. Murthy, James E. Gilchrist, and Jeptha E. Campbell, Jr., Cincinnati, Ohio, assignors to the United States of America as represented by the United States Atomic Energy Commission
Filed Apr. 29, 1963, Ser. No. 276,672
8 Claims. (Cl. 99—60)

This invention deals with the removal of radioactive ions from milk and in particular with the removal of $I^{131}$ by anion exchange.

Milk, in case of nuclear accidents or in areas of nuclear weapon activity, takes up or forms fission products either as fall-out or by reaction with neutrons or the like. One of the most hazardous radioactive isotopes present in milk so exposed is $I^{131}$. This isotope is particularly harmful to infants, and the tolerance therefore is particularly low for them, the maximum daily intake permissible of $I^{131}$ for children being 100 $\mu\mu c$. Cow milk contains at least 90%, but mostly more, of the $I^{131}$ in inorganic form adsorbable by anion exchange resins, the remainder, if any, being present in organic protein-bound form.

Anion exchange resins in the chloride form have been used heretofore for the removal of $I^{131}$ from milk and other aqueous liquids; from 90 to 93% of the $I^{131}$ present was usually removed thereby. However, these anion exchange methods used heretofore showed the drawback that the anionic composition of the milk and its flavor were changed, which, of course, is an undesirable side effect. The chloride anion content was increased by an average of about 50%, since the anion exchange resin was used in the chloride form, while the phosphate anion content was usually decreased by about 12%.

It was then tried to preequilibrate the resin prior to contact with the milk in an attempt to "preserve" the original anion concentrations. For this purpose an equilibrating or "charging solution" was brought in contact with the resin, the solution containing chloride, phosphate and citrate anions in the same ratio as that of the milk; however, in concentrations about five times as high as those of the milk. The result was an effluent milk product that had an utterly different anionic composition than the original milk before treatment.

It is an object of this invention to provide a process for the anion exchange treatment of milk for the removal of $I^{131}$ in which neither composition nor flavor, odor, density, pH value, appearance or sodium content are changed.

It is also an object of this invention to provide a process for the anion exchange treatment of milk for the removal of $I^{131}$ by which $I^{131}$ is removed to an especially high degree.

It is another object of this invention to provide a process for the anion exchange treatment of milk for the removal of $I^{131}$ in which chloride, phosphate and citrate anion contents are substantially maintained at the level of the untreated milk.

It is finally also an object of this invention to provide a process for the anion exchange treatment of milk for the removal of $I^{131}$ for which only one pass of the milk over one type of resin is necessary to accomplish the desired result.

These objects are accomplished by contacting an anion resin with a charging solution having the same pH value as that of the milk to be treated and having a chloride concentration about four times that of the milk, a concentration of inorganic phosphate about 4.6 times that of the milk and a citrate concentration about twenty times that of the milk, washing the resin thus charged with distilled water to remove any adhereing, nonadsorbed anions, contacting the resin with the milk to be treated, whereby the iodine is removed, and a milk product is obtained the chloride, phosphate and citrate concentrations of which are substantially unchanged.

Any strong-base quaternary ammonium-type resin can be used for the process of this invention. For the study that led to the process herein claimed, Dowex 2–X8 was used, which is a resin made according to Example 4 of U.S. Patent 2,614,099, granted to William C. Bauman et al. on October 14, 1952, and which was cross-linked to 8%. The resin had a mesh size of between 20 and 50 and was in the chloride form.

It was very surprising when it was found that the charging solution had to have an entirely different composition as to chloride, phosphate and citrate anions from that present in milk in order to obtain a milk product after resin treatment that, apart from the iodine content, had the same composition as the contaminated milk to be treated.

In order to arrive at the concentrations necessary in the charging solution to obtain a milk product, after contact with the resin, having the same chloride, phosphate and citrate contents, a number of resin samples were contacted with charging solutions of different anion contents; 20 ml. portions of Dowex 2–X8 were contacted with the charging solutions for this purpose. The adsorbed anions were then eluted from the resin and analyzed; the contents were an indication of the quantity of anions adsorbed on the resin. Likewise, 20-ml. portions of resin were contacted with 1.5-liter portions of fresh raw whole milk and then washed with distilled water. In both instances the resin portions were eluted with 200 ml. of an aqueous solution 2 N in $NaNO_3$ and 0.16 N in $HNO_3$ to remove the adsorbed anions. All eluates were analyzed for their anions to determine the quantities adsorbed from the charging solution and the milk. A graph was then prepared showing the interrelation between anion concentrations in charging solution and concentrations of the corresponding anions adsorbed from the milk samples on the resin. The curves are shown in the accompanying drawing; the concentrations are given in mM/l. It will be noted that the mole fraction of the phosphate on the resin changed very little for different concentrations in the charging solutions.

The average composition of milk was determined and found to be about 30.9 mM/l. of chloride anion, about 21.6 mM/l. of inorganic phosphate and about 9.2 mM/l. of citrate. Assuming a total content of the above three anions of one on the resin, this corresponds to a mole fraction of 0.632 for the chloride, 0.075 for the inorganic phosphate and 0.293 for the citrate.

From the curves of the drawing, it can be determined which concentrations of the various anions the charging solution should have to obtain this above ratio on the resin. The diagram shows that the charging solution should contain 125 mM of chloride anion, 100 mM of inorganic phosphate anion and 185 mM of citrate per one liter of solution. By then dividing these concentrations of the charging solution by those present in the average milk for each anion, coefficients are obtained that determine the proper concentrations in the charging solution for all average milks on the basis of the anion concentrations of the latter.

These coefficients are 4.03 for the chloride, 4.64 for the inorganic phosphate and 20.4 for the citrate. This means that the charging solution has to contain chloride anion in a quantity about 4 times that of the content in the milk to be treated, phosphate about 4.6 times and citrate about 20 times in order to obtain a milk product that has the same composition as the milk before treatment. This ratio thus is the key for the equilibration of the resin with a properly composed charging solution prior to its use for milk treatment.

Thus, before equilibrating the resin with the charging solution, the milk to be treated must be analyzed for its content of anions and its pH value. Thereafter, the proper concentration of the charging solution is calculated using the above coefficients, and the charging solution is prepared according to these calculations using the sodium salts NaCl, $NaH_2PO_4$ and $Na_3C_6H_5O_7$. The pH value of the charging solution is then adjusted to that of the milk, for instance with a 2 N solution of sodium hydroxide.

The charging solution is passed over the resin until the effluent has the same composition as the charging solution, in other words until equilibrium has been reached on the resin. This usually requires about 350 ml. of charging solution per each 15-ml. batch of resin. Excess anions adhering to the resin but not in equilibrium therewith are then washed off with distilled water. The resin is then ready for the treatment of the milk.

The milk is contacted with the resin by continuous column operation, and preferably at a comparatively low temperature, so that no bacterial growth occurs. A temperature of between 1 and 30° C. is suitable. It was found that a change in temperature has no effect on the efficiency of the iodine removal. Likewise, changes in flow rate do not alter the iodine adsorption. A flow rate of between 5 and 20 ml./min. was found suitable, a rate of between 12 and 14 ml./min. being preferred. Under the conditions just set forth, one pass of the milk over the resin is sufficient to remove more than 95% of the $I^{131}$.

Using the above-specified Dowex 2–X8, it was found that with up to 120 bed volumes of milk the iodine removal ranged between 96 and 100% and with up to 230 bed volumes, the iodine adsorption averaged about 95%.

The resin, after contact with the milk, can then be regenerated; the adsorbed iodine is removed either with 2 N hydrochloric acid or with 2 N sodium nitrate in 0.16 N nitric acid or with 2 N perchloric acid. Any of the three eluants desorbed 90% of the adsorbed $I^{131}$. However, hydrochloric acid was the preferred eluant, because it is the least objectionable in the processing of the milk. For the tests that were carried out to devise the process of this invention, the $I^{131}$-contaminated milk was synthesized by incorporating the iodine in the form of a basic sulfite solution of carrier-free sodium iodide, $NaI^{131}$. The activity of the solution was known or determined; its pH value usually was within the range of between 7 and 11. After addition of the sodium iodide, the milk was allowed to equilibrate at 4° C. for at least 24 hours. The $I^{131}$ was determined in the treated and untreated milk by gross gamma-counting or by gamma spectroscopy.

No difference was found in the taste of pasteurized (145° F.–30 min.) untreated and pasteurized milk resin-treated by the process of this invention. Other characteristics also were found identical.

In the following, two examples are given for illustrative purposes.

EXAMPLE I

Fifteen milliliters of a fully hydrated Dowex 2–X8 resin in the chloride form of a particle size of from 20 to 50 mesh were poured into a glass column 1.5 cm. in diameter and 4.5 cm. high. This resin column was charged downwardly at a rate of between 2 and 3 ml./min. with a mixed aqueous sodium salt solution having a temperature of 25° C. and containing 4.03 times as high a concentration of chlorides, 4.64 times the concentration of inorganic phosphates and 20.4 times the citrate concentration as those present in the milk to be treated. The pH value of the charging solution had been adjusted to that of milk, namely 6.6, with a 6 N sodium hydroxide solution. After the charging procedure, excess of the solution was removed from the resin by washing the column with one liter of distilled water at a rate of between 4 and 5 ml./min.

Thereafter, fresh, raw, whole milk was passed over the pretreated resin column at between 10 and 15° C. and a rate of between 12 and 14 ml./min. Of each 100-ml. fraction of effluent milk, a 25-ml. sample was taken and analyzed for anion contents. The results are given in Table I.

Table I

| Sample | Chloride, g./l. | Inorganic Phosphate, g./l. | Citrate, g./l. |
| --- | --- | --- | --- |
| Untreated milk | 1.08 | 0.644 | 1.84 |
| Resin effluents: | | | |
| 1st 25 ml. | 1.14 | 0.629 | 1.77 |
| 4th 25 ml. | 1.14 | 0.642 | 1.86 |
| 8th 25 ml. | 1.12 | 0.647 | 1.80 |
| 12th 25 ml. | 1.10 | 0.646 | 1.82 |
| 16th 25 ml. | 1.10 | 0.642 | 1.86 |

An equilibrium with the resin was established after about 50 ml. of the milk had passed through the ion exchange column. From there on the composition of the milk leaving the resin was substantially the same as that of the untreated milk.

EXAMPLE II

The degree of iodine removal was determined in this example. For this purpose, sodium iodide of the isotope $I^{131}$ was added in varying quantities, namely of between 6,500 and 02,000 $\mu\mu c./l.$ to samples of fresh, raw, whole milk. After thorough mixing the milk was allowed to stand for 24 hours at 4° C. for "equilibration." Resin columns pretreated as is described in Example I were used, the operating conditions being about the same as were used there.

Each milk sample was analyzed before treatment with the resin for its iodine content by placing 25-ml. portions in a polyethylene bottle adjacent a 2-inch sodium iodide (Tl) scintillation crystal detector assembly that was coupled to a decade scaler through a photomultiplier tube and a cathode follower. Gamma-ray emission from the $I^{131}$ was determined for each column effluent sample as well as for the untreated sample. Two parallel runs were carried out in each case, and the results were averaged. The latter are given in Table II.

Table II

| Sample: | Percent $I^{131}$ removed |
| --- | --- |
| 1st 100 ml. | 99.3 |
| 2nd 100 ml. | 98.7 |
| 3rd 100 ml. | 98.5 |
| 4th 100 ml. | 98.5 |
| 8th 100 ml. | 97.7 |
| 13th 100 ml. | 96.5 |
| 20th 100 ml. | 95.0 |
| 25th 100 ml. | 92.6 |
| 30th 100 ml. | 90.6 |
| 35th 100 ml. | 88.4 |

The data show that an iodine removal of above 90% is accomplished for the first 3 liters of milk.

It will be understood that the invention is not to be limited to the details given herein but that it may be modified within the scope of the appended claims.

The embodiments of the invention in which an exclusive property or privileges is claimed are defined as follows:

1. A process of removing iodine isotopes from milk, comprising contacting a strong-vase quaternary ammonium-type anion exchange resin in its chloride form with a charging solution having the same pH value as the milk to be treated and having a chloride concentration from 3.9 to 4.1 times that of the milk, a phosphate concentration from 4.5 to 4.7 times that of the milk and a citrate concentration from 20 to 21 times that of the milk; washing the resin thus charged with distilled water; contacting the resin with the milk to be treated, whereby iodine is removed and a milk product is obtained that has substantially unchanged chloride, phosphate and citrate concentrations.

2. The process of claim 1 wherein the chloride concentration of the charging solution is about 4, the phosphate concentration about 4.6 and the citrate concentration about 20 times that of the corresponding concentrations in the milk.

3. The process of claim 1 wherein the chloride, phosphate and citrate anions are present in the charging solution in the form of the sodium salts.

4. The process of claim 1 wherein the milk has a temperature of from 1 to 30° C.

5. The process of claim 4 wherein the temperature of the charging solution is room temperature.

6. The process of claim 1 wherein the resin after treatment with milk is regenerated by elution with dilute hydrochloric acid.

7. The process of claim 1 wherein the resin after treatment with milk is regenerated by elution with a dilute aqueous solution containing sodium nitrate and free nitric acid.

8. The process of claim 1 wherein the resin after treatment with milk is regenerated by elution with dilute perchloric acid.

References Cited in the file of this patent

UNITED STATES PATENTS 3,020,161    Murthy et al. _____ Feb. 6, 1962

FOREIGN PATENTS 599,764    Canada _____ June 14, 1960

OTHER REFERENCES

Murthy et al.: Journal of Dairy Science 45, 1066–1074, September 1962.